June 6, 1944.　　B. T. MALACHOWSKI　　2,350,627
CLUTCH MECHANISM
Filed Dec. 24, 1941　　3 Sheets-Sheet 1
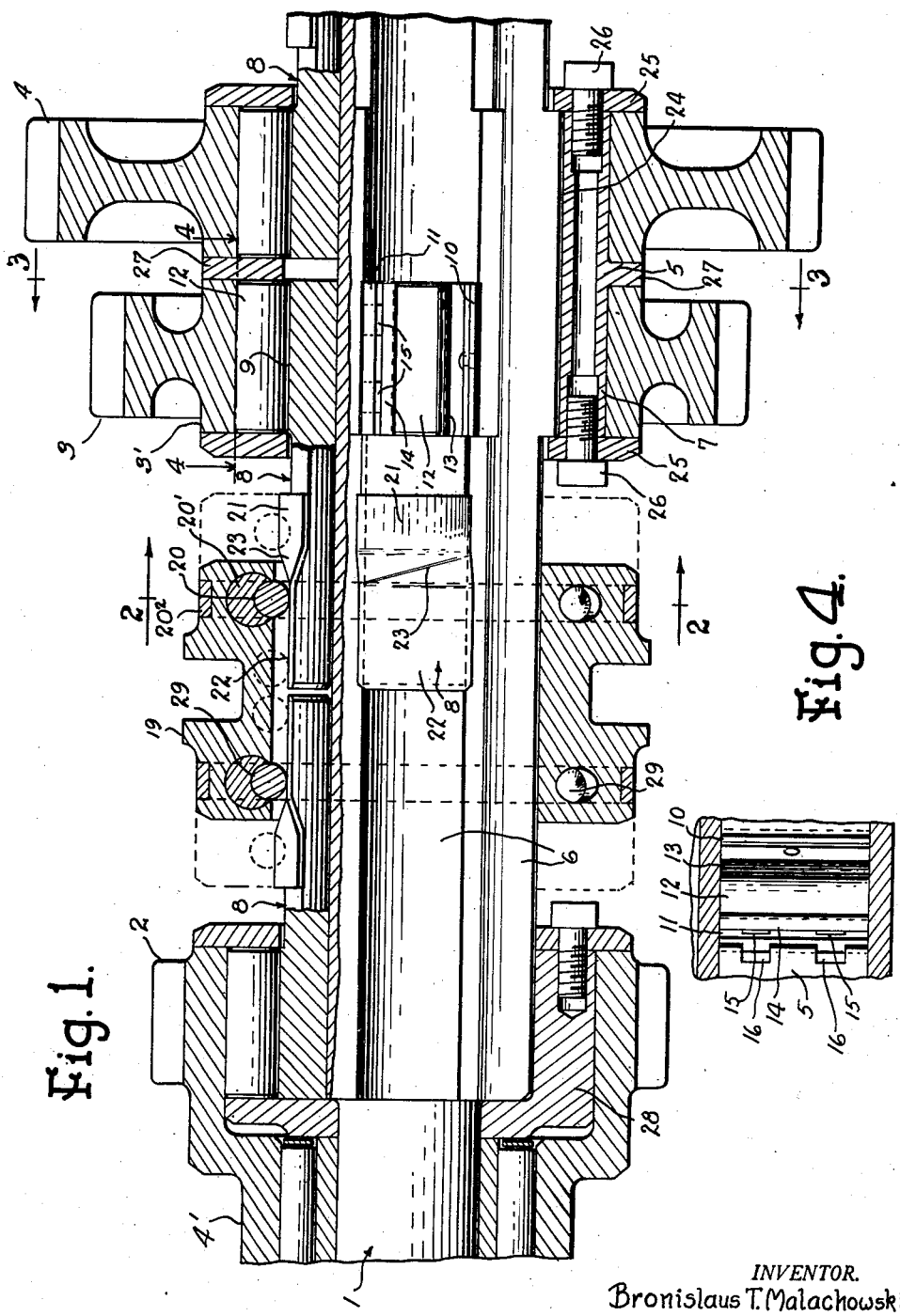
INVENTOR.
Bronislaus T. Malachowski
BY
Attorneys

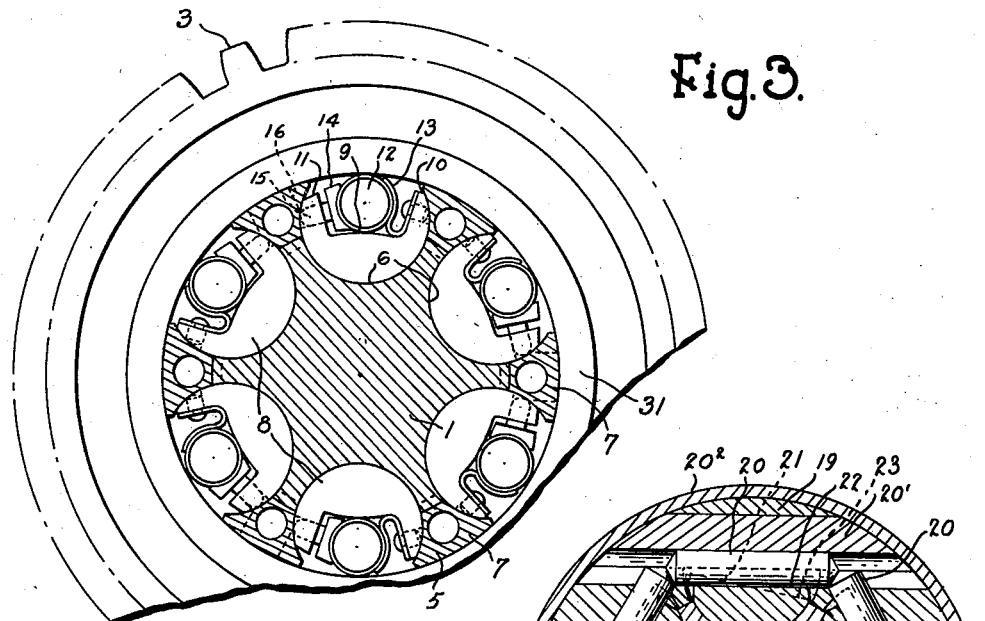
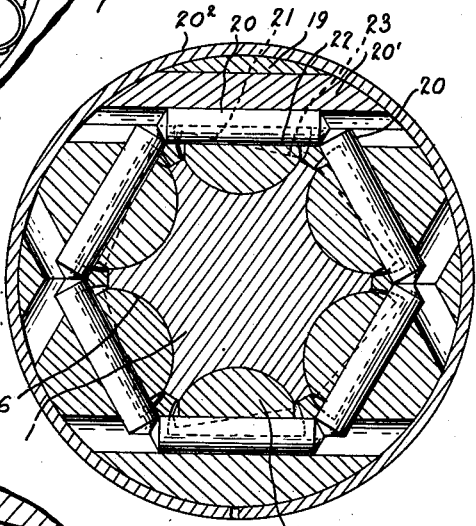
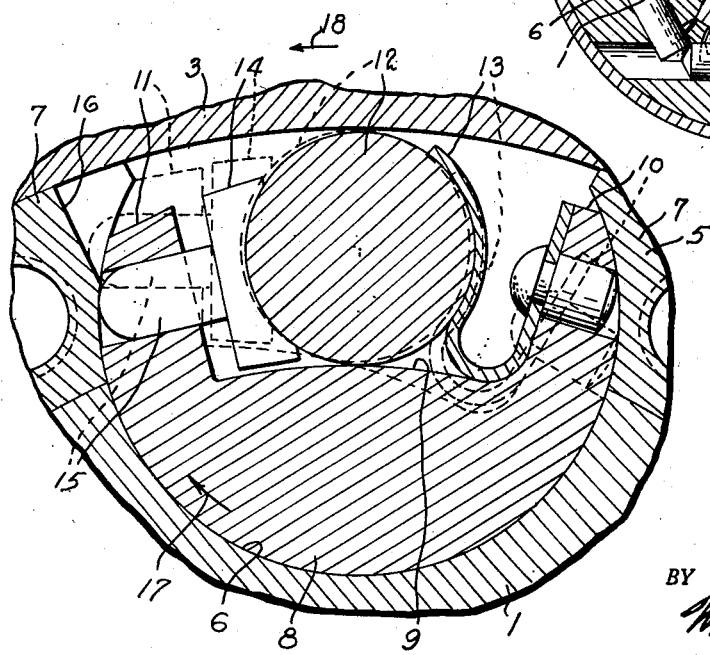

June 6, 1944.  B. T. MALACHOWSKI  2,350,627
CLUTCH MECHANISM
Filed Dec. 24, 1941  3 Sheets-Sheet 3

INVENTOR.
Bronislaus T. Malachowski
BY
Attorneys

Patented June 6, 1944

2,350,627

UNITED STATES PATENT OFFICE 2,350,627

CLUTCH MECHANISM

Bronislaus T. Malachowski, Detroit, Mich.

Application December 24, 1941, Serial No. 424,337

11 Claims. (Cl. 192—74)

The invention relates to clutch mechanisms and refers more particularly to clutch mechanisms for use in mechanical power transmissions, such as transmissions and differentials of motor vehicles, power drive transmissions of conveyors, machine tools, and the like.

The invention has for one of its objects to provide an improved clutch mechanism which is simple in construction and effective in operation.

The invention has for another object to provide the clutch mechanism with an improved operating device.

The invention has for further objects to provide the clutch mechanism with means for positively returning and holding the rolls of the clutch mechanism in inoperative or released position when the cam members of the clutch mechanism are being returned to and are in neutral position; and to provide the clutch mechanism with means for resiliently urging the rolls out of inoperative or released position to operative position.

With these as well as other objects in view, the invention resides in the novel features of construction and combinations and arrangements of parts as more fully hereinafter set forth.

In the drawings:

Figure 1 is a longitudinal section through a mechanical power transmission having a clutch mechanism embodying the invention;

Figures 2 and 3 are cross sections on the lines 2—2 and 3—3, respectively, of Figure 1;

Figure 4 is a cross section on the line 4—4 of Figure 1;

Figure 5 is an enlarged view of a portion of Figure 3 illustrating the operation of the clutch mechanism;

Figure 6:
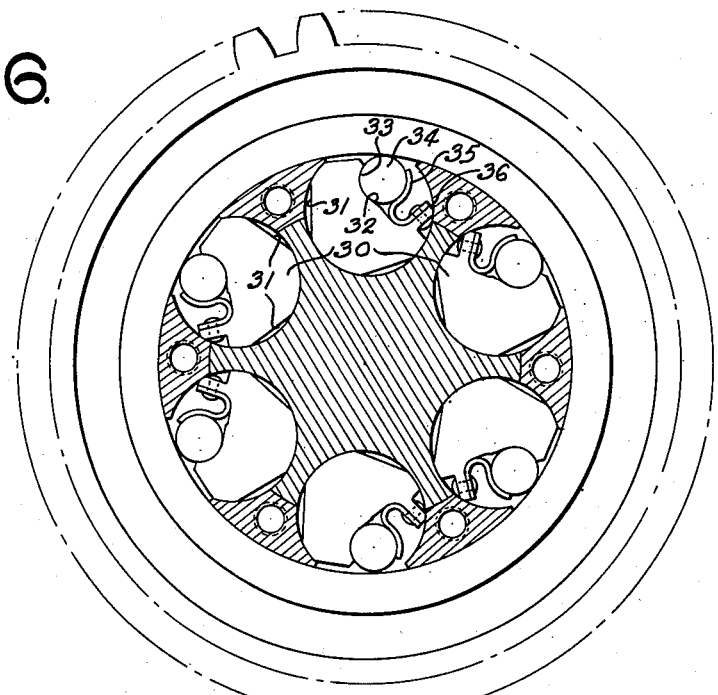
Figure 6 is a view similar to Figure 3 illustrating another embodiment of the invention.

While the clutch mechanism embodying the invention may be used in various mechanical power transmissions, the clutch mechanism as illustrated is used in a motor vehicle change speed transmission in which 1 is the main shaft and 2, 3 and 4 are gears encircling the main shaft and intended to be clutched thereto. It is to be noted that the gear 2 is on and driven by the engine shaft 4' and that the counter shaft as well as other parts of the transmission are not illustrated.

Referring to the clutching mechanism for operatively connecting the gear 3, which forms the rotatable outer member, to the main shaft 1, which forms the rotatable inner member, 5 is a bushing encircling and fixedly secured to the main shaft, the bushing preferably having a press fit on the main shaft. The gear 3 is journaled on the bushing 5, there being the usual running clearance between the gear and bushing. The main shaft has the longitudinally extending grooves 6 equally spaced angularly about its periphery and formed with arcuate bearing surfaces. The bushing 5 is cut away to, in effect, form bars 7 having on their opposite sides arcuate surfaces in continuation of the arcuate surfaces of the grooves and having the same centers. Cam members in the nature of the cam rods 8 extend longitudinally of the main shaft within the grooves and between the bars and engage the arcute bearing surfaces of the grooves and bars. These cam rods extend throughout the width of the hub 3' of the gear 3 and an appreciable distance beyond one side thereof. Each cam rod is formed with the cam 9 extending longitudinally thereof throughout approximately the width of the hub 3' and with the projections 10 and 11 at the side edges and extending transversely of the cam generally radially outwardly relative to the main shaft. 12 are rolls which, as shown, are cylindrical rollers, there being one roll for each cam rod located in the space formed by the cam 9, the inner periphery of the gear hub 3', and the projections 10 and 11. The roll is yieldably urged in one direction angularly of the cam rod by the spring 13 which is generally U-shaped and has one arm fixedly secured to the projection 10 as by means of a rivet and another arm engaging the roll. This latter arm is preferably arcuate and has the same radius of curvature as that of the roll. The roll at the side opposite the spring is engaged by the shoe 14 preferably having an arcuate surface engaging the roll and with the same radius of curvature as that of the roll. The shoe 14 is provided with the pair of pins 15 which slidably engage the projection 11. These pins in the operative position of the cam rod are adapted to extend into generally radial grooves 16 formed in the outer portions of the adjacent bar 7 of the bushing.

Referring more particularly to Figure 5, the construction is such that when the cam rod 8 is in its neutral position the roll 12 is in inoperative or released position clearing the inner periphery of the hub 3' of the gear 3 so that the latter is disconnected from the main shaft 1. At this time it will be noted that the pins 15 are in engagement with the solid portion of the arcuate surface of the adjacent bar 7 of the bushing radially inwardly of the grooves 16 so that the shoe 14 positively holds the roll 12 in its inoperative position. The arrangement and the positions of the parts as thus far described is shown by full lines in Figure 5. When the cam rod is turned from neutral position in the direction indicated by the arrow 17, the cam 9 moves the roll 12 generally radially outwardly into contact with the inner periphery of the hub 3' of the gear 3 and with the gear rotating in the direction indicated by the arrow 18 in Figure 5, the roll is moved peripherally in the direction of the arrow 18 to effect a firm driving engagement with the cam and the inner periphery. During this movement, the spring 13 serves to resiliently urge the roll in the direction of the arrow 18 and the shoe 14 moves generally in the same direction so that the pins 15 move into the grooves 16. At this time the gear 3 through the roll 12 and the cam rod 8 rotates the main shaft 1 in the same direction. The parts in their operative positions are as illustrated by the dotted lines in Figure 5. When the cam rod 8 is turned back to its neutral position, the pins 15 move into engagement with the solid portion of the arcuate surface of the adjacent bar 1 to positively return the roll to its inoperative position.

There are an equal number of cam rods which might be said to be arranged in pairs with the cam rods of each pair opposed and adapted to be simultaneously turned in opposite directions from neutral position to operative position so that the gear 3 may be operatively connected to the main shaft 1 in either direction of rotation of the gear. Specifically, there are three such pairs of cam rods so that for either direction of rotation of the gear the clutching takes effect in three zones spaced at equal distances about the inner periphery of the gear. In this connection, the running clearance between the gear 3 and the bushing assists in the three zone clutching.

For the purpose of turning the cam rods 8, a device encircling and reciprocable longitudinally of the cam rods is provided. The device, as shown, comprises the shifter collar 19 encircling portions of the cam rods axially beyond the gear 3 and provided with the rectilinear abutments 20 corresponding in number to the number of and engaging the cam rods. As illustrated, there are six such abutments and they are arranged in hexagonal relation. Also, the abutments are cylindrical rollers preferably rotatably mounted in intersecting bores in the shifter collar near an end thereof. One of the bores is of larger diameter than the other bores and receives the key 20' for engaging and holding the associated roller in proper position. This roller and also the other rollers abut at adjacent ends so that all rollers are retained in the shifter collar without the necessity of closing the ends of the bores. The key is held in place by the resilient split ring 20². This arrangement provides for a simple method of assembling the rollers with the shifter collar. The portions of the rollers between their ends project radially inwardly beyond the inner periphery of the shifter collar to provide working clearance for the cam rods when they are turned relative to the shifter collar. Each cam rod axially beyond the gear collar. 3 is provided with the flat bearing surfaces 21 and 22 extending at an angle to each other and with the intermediate bearing surface 23 connecting the bearing surfaces 21 and 22. The intermediate bearing surface is a warped surface merging at its ends into the bearing surfaces 21 and 22 and comprising successive flat surfaced increments longitudinally of the cam rod so that the successive increments will have full line contact transversely of the cam rod with a roller 20. Inasmuch as the cam rods are arranged in pairs with the cam rods of each pair reversely arranged, it will be seen that when the shifter collar is moved longitudinally it will turn the cam rods of each pair in opposite directions. Also, the shifter collar will be positively rotated by the cam rods with the main shaft when it is being rotated.

As illustrated in the present instance, both the gears 3 and 4 are journaled on the bushing 5. The bushing has a press fit on the enlargement 24 of the main shaft 1 and it is held from longitudinal displacement by means of the end plates 25 engaging the shoulders at the ends of the enlargement and suitably secured to the bushing as by means of the screws 26. The end plates also serve to hold the gears 3 and 4 on the bushing, the bushing 5 being provided with the integral radially extending annular flange 27 between and abutting with the gears. The gear 4 is adapted to be clutched to the main shaft 1 by a clutch mechanism identical with that for clutching the gear 3 to the main shaft 1.

The gear 2 is adapted to be clutched to the main shaft 1 by a clutch mechanism also identical, with the exception that the bushing 28 has journaled thereon the gear 2 only. It will be noted that the shifter collar 19 is provided with a second set of cylindrical rollers 29 corresponding to the set of rollers 20 and that by shifting the shifter collar 19 toward the gear 2 the clutch rods forming part of the clutch mechanism for the gear 2 may be turned. In this connection the lengths of the flat bearing surfaces 22 of the cam rods are such that when the shifter collar is moved longitudinally in either direction to turn one set of shifter rods, the set of cylindrical rollers for turning the other set of shifter rods remain in contact with the flat surfaces of the latter shifter rods to hold the same from turning.

Figure 7:
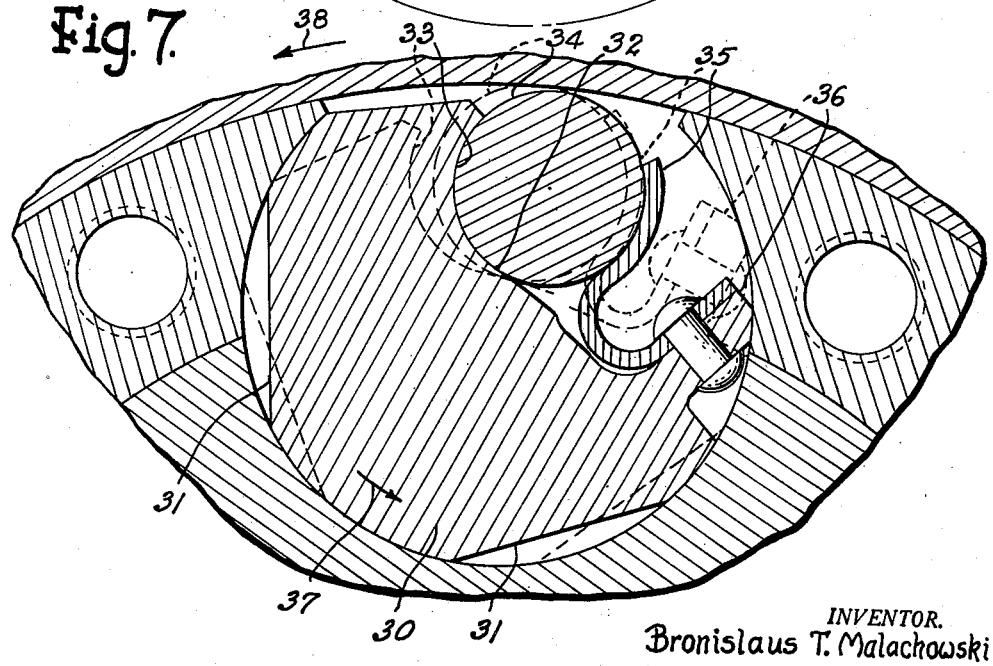
Figure 7 is a view similar to Figure 5 of a portion of Figure 6.

Figures 6 and 7 illustrate another embodiment of the invention which in general is the same as that of Figures 1 to 5, inclusive. However, this second embodiment differs in forming each cam rod 30 with the flats 31 to decrease the resistance to the turning of the cam rod, in forming each cam rod with the cam 32 radially outwardly of the axis of the cam rod, and in forming each cam rod with the arcuate surfaced projection 33 for directly engaging the roll 34. 35 is a spring corresponding to the spring 13 fixedly secured to the projection 36 of the cam rod and yieldably urging the roll 34 in a direction toward the projection 33. It will be noted that when the cam rods are in neutral position both their springs 35 and projections 33 contact with the rolls and serve to hold the same out of contact with the inner periphery of the rotatable outer member or gear.

Referring to Figure 7, when the cam rod 30 is in neutral position the roll 34 clears the inner periphery of the rotatable outer member or gear and the projection 33 of the cam rod and the spring 35 engage opposite sides of the roll to hold the same out of engagement with the inner periphery, the parts at this time being in the positions indicated by the full lines. However, when the cam rod is turned in the direction indicated by the arrow 37 its cam moves the roll 34 generally radially outwardly into engagement with the inner periphery of the rotatable outer member or gear which is rotating in the direction indicated by the arrow 38. As a result, the roll is moved peripherally in the same direction, the movement being assisted by the spring 35, into effective driving engagement. The turning of the cam rod is sufficient to move the arcuate surface of its projection 33 away from the roll. The positions of the parts when in operative position are as indicated by the dotted lines.

What I claim as my invention is:

1. In a clutch mechanism, a rotatable shaft having longitudinally extending grooves with arcuate bearing surfaces, a rotatable member encircling said shaft, cam rods extending within the grooves and engaging said bearing surfaces and having longitudinally extending cams spaced radially inwardly from said encircling member, said cam rods also having flat bearing surfaces at an angle to each other and an intermediate warped bearing surface, rolls between and engageable with said cams and encircling member, and means rotatable in unison with said shaft and engageable with said bearing surfaces, for turning said cam rods relative to said shaft to compel said rolls to simultaneously engage both said cams and encircling member.

2. In a clutch mechanism, a rotatable shaft having longitudinally extending grooves with arcuate bearing surfaces, a rotatable member encircling said shaft, cam rods extending within the grooves and engaging said bearing surfaces and having longitudinally extending cams spaced radially inwardly from said encircling member, rolls between and engageable with said cams and encircling member, means upon said cam rods for limiting movement of said rolls angularly in one direction relative to said cam rods and for holding said rolls out of contact with said rotatable member, and means for turning said cam rods relative to said shaft to compel said rolls to simultaneously engage both said cams and encircling member.

3. In a clutch mechanism, a rotatable shaft having longitudinally extending grooves with arcute bearing surfaces, a rotatable member encircling said shaft, cam rods extending within the grooves and engaging said bearing surfaces, rolls between and engageable with said encircling member and the cams of said cam rods, means upon said cam rods for limiting movement of said rolls angularly in one direction relative to said cam rods, means upon said cam rods for resiliently urging said rolls angularly in the same direction relative to said cam rods and for holding said rolls out of contact with said rotatable member, and means for turning said cam rods relative to said shaft from neutral to operative positions to compel said rolls to simultaneously engage said encircling member and the cams of said cam rods.

4. In a clutch mechanism, a rotatable shaft having longitudinally extending grooves with arcuate bearing surfaces, a rotatable member encircling said shaft, cam rods extending within the grooves and engaging said bearing surfaces, rolls between and engageable with said encircling member and the cams of said cam rods, means for turning said cam rods relative to said shaft from neutral to operative positions to compel said rolls to simultaneously engage said encircling member and the cams of said cam rods, and means engageable with said rolls to positively hold same in released position when said cam rods are in neutral position.

5. In a clutch mechanism, a rotatable shaft having longitudinally extending grooves with arcuate bearing surfaces, a bushing sleeved on said shaft, a rotatable member journaled on said bushing, cam rods extending within the grooves and engaging said bearing surfaces, rolls between and engageable with said rotatable member and the cams of said cam rods, and means carried by said cam rods engageable with said rolls and bushing to positively hold said rolls in released position when said cam rods are in neutral position.

6. In a clutch mechanism, a rotatable shaft having longitudinally extending grooves, a bushing sleeved on said shaft, a rotatable member journaled on said bushing, cam rods extending within the grooves, rolls between and engageable with said rotatable member and the cams of said cam rods, shoes carried by said cam rods engageable with said rolls, and means on said shoes engageable with said bushing to positively hold said rolls in released position when said cam rods are in neutral position.

7. In a clutch mechanism, a rotatable shaft having longitudinally extending grooves, a rotatable member encircling said shaft, cam rods extending within the grooves, rolls between and engageable with said rotatable member and the cams of said cam rods, and projections on said cam rods engageable with said rolls to positively hold the same in released position when said cam rods are in neutral position.

8. A clutch mechanism for rotatable inner and outer members comprising cam members movable as a unit with one of said rotatable members during rotation of the latter, said cam members being angularly spaced and adapted to turn relative to and through a path normal to the axis of said last mentioned rotatable member, said cam members having longitudinally spaced flat surfaces at an angle to each other and an intermediate warped surface connecting said flat surfaces, rolls between and engageable with the other of said rotatable members and the cams of said cam members, and means movable longitudinally of said cam members for simultaneously turning certain of said cam members in opposite directions, said means comprising a set of rectilinear surfaced members corresponding to said cam members and engageable with said flat and warped surfaces of said cam members.

9. A clutch mechanism for rotatable inner and outer members comprising cam members movable as a unit with one of said rotatable members during rotation of the latter, said cam members being angularly spaced and adapted to turn relative to and through a path normal to the axis of said last mentioned rotatable member, said cam members being reversely arranged and having longitudinally spaced flat surfaces at an angle to each other and intermediate warped surfaces connecting said flat surfaces, rolls between and engageable with the other of said rotatable members and the cams of said cam members, a collar movable longitudinally of said cam members, and cylindrical members carried by and movable with said collar and corresponding to said cam members and engageable with said flat and warped surfaces.

10. In a clutch mechanism, a rotatable shaft having longitudinally extending grooves, rotatable members encircling said shaft, sets of cam rods extending within the grooves and having cams spaced radially inwardly from said rotatable members, said sets of cam rods having at their adjacent ends flat bearing surfaces and also having other flat bearing surfaces spaced longitudinally from said first mentioned flat bearing surfaces and arranged at an angle thereto and further having intermediate warped bearing surfaces between said flat bearing surfaces, rolls between and engageable with said cams and rotatable members, and means rotatable in unison with and movable longitudinally of said shaft along said bearing surfaces to turn said cam rods to thereby compel said rolls to engage both said cams and rotatable members, said means being continuously engageable with the first mentioned flat bearing surfaces of one set of said cam rods while moving over the bearing surfaces of the other set of said cam rods.

11. A clutch mechanism for rotatable inner and outer members comprising cam members movable as a unit with one of said rotatable members during rotation of the latter, said cam members being angularly spaced and adapted to turn relative to and through a path normal to the axis of said last mentioned rotatable member, said cam members having longitudinally spaced flat surfaces at an angle to each other and an intermediate warped surface connecting flat surfaces, members between and engageable with the other of said rotatable members and the cams of said cam members, and means movable longitudinally of said cam members and engageable with said flat and warped surfaces for turning said cam members.

BRONISLAUS T. MALACHOWSKI.